United States Patent [19]

Tokunaga

[11] Patent Number: 5,233,178
[45] Date of Patent: Aug. 3, 1993

[54] CONTACT TYPE IMAGE SENSOR AND METHOD OF PRODUCING THE SAME

[75] Inventor: Mitsuhiro Tokunaga, Tokyo, Japan
[73] Assignee: NEC Corporation, Tokyo, Japan
[21] Appl. No.: 858,597
[22] Filed: Mar. 27, 1992
[30] Foreign Application Priority Data Mar. 29, 1991 [JP] Japan .............................. 3-027130[U]

[51] Int. Cl.[5] ............................................. H01J 40/14
[52] U.S. Cl. .................................... 250/208.1; 250/239
[58] Field of Search ................. 250/208.1, 239, 211 J, 250/211 R, 214.1; 358/482, 483, 484, 496; 357/30 D, 30 H, 30 Q, 30 M, 30 R; 257/433, 434, 680, 684

[56] References Cited

U.S. PATENT DOCUMENTS

| | | | |
|---|---|---|---|
| 4,142,137 | 8/1992 | Kushino et al. | 250/208.1 |
| 4,808,812 | 2/1989 | Tanaka et al. | 250/239 X |
| 4,908,718 | 3/1990 | Shimada | 358/482 X |
| 5,051,802 | 9/1991 | Prost et al. | 357/30 D |
| 5,142,381 | 8/1992 | Kitamura et al. | 358/482 |

FOREIGN PATENT DOCUMENTS 0325369 7/1989 European Pat. Off. .
59-48954 3/1984 Japan .
1374914 11/1974 United Kingdom .

*Primary Examiner*—David C. Nelms
*Assistant Examiner*—John R. Lee
*Attorney, Agent, or Firm*—Sughrue, Mion, Zinn, Macpeak & Seas

[57] ABSTRACT

In an image sensor, a light receiving element unit is retained by a housing. The housing is produced with an injection plastic material through a monoblock molding. The light receiving element unit includes photoelectric converter, window, and electrode. Before the molding of the housing, the unit is installed at a predetermined position of a metallic mold. A surface of the unit is resultantly formed to be in a plane where a document conveying surface of the housing exists or to have a step relative to the document conveying surface.

5 Claims, 4 Drawing Sheets

F I G. 5
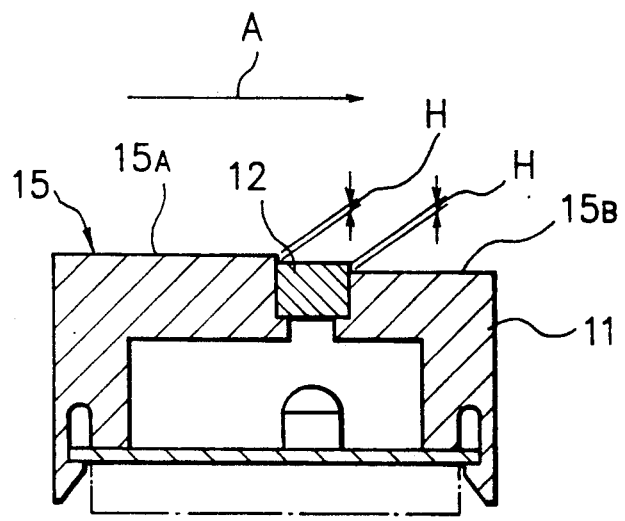

CONTACT TYPE IMAGE SENSOR AND METHOD OF PRODUCING THE SAME

BACKGROUND OF THE INVENTION

The present invention relates to an image sensor, and in particular, to an image sensor of a complete contact type suitable for use with apparatuses such as a facsimile, a copying machine, and an image scanner.

DESCRIPTION OF THE PRIOR ART

An image sensor is, as well known, a device for converting optical information of an image into an electric signal. For example, there has been utilized an image sensor of a complete contact type in which an original document is completely brought into contact with the image sensor when the contents of the document are to be sensed.

In a conventional image sensor of this type, as described, for example, in the Japanese Patent Laid-Open No. 48954/1984, a light receiving element substrate including a photoelectric converting member, a photoconductive or light guide window, electrodes, etc. is positioned in contact with an original manuscript such that the manuscript is transported on the substrate during operation. A light source is disposed below the light receiving element substrate. A light illuminated from the light source passes through the window and then is reflected on the manuscript and received by the photoelectric converting member. The light is thereby converted into an electric signal. An electric current thus developed through the photoelectric conversion is obtained from the electrodes. The light receiving element substrate is retained by a housing together with other constituent components such as the light source, a driver circuit substrate, and a paper guide.

In the case where only the light receiving element substrate is to be in contact with the original document, the document cannot be smoothly conveyed thereon. To overcome this difficulty, connection glass regions or plates are disposed before and after the light receiving element substrate such that surfaces respectively of the glass regions and the substrate are arranged in an identical plane. The substrate and the glass regions are fixed onto a support glass region to be retained thereon so as to form the identical plane.

Since the conventional image sensor of the complete contact type is produced such that the connection glass and the support glass are fixed onto the light receiving element substrate, the numbers respectively of parts and manufacturing steps are increased, which leads to an increase in cost and reduction in the production yield due to the difficulty of the bonding or fixing of the components. On the other hand, the housing may be structured to have functions of the connecting glass regions and the support glass region. In this case, however, in regard to the manufacturing precision of the housing and the accuracy of bonding between the housing and the light receiving element substrate, the structure above is attended with a problem. Namely, it is difficult to establish a satisfactory plane for feeding thereon the document without any hindrance.

SUMMARY OF THE INVENTION

It is therefore an object of the present invention to provide an image sensor and a method of producing the sensor in which the number of constituent parts and the number of production steps are decreased so as to thereby improve the production yield and to smoothly convey the document, thereby removing the problems above.

In accordance with the present invention, there is provided an image sensor including light receiving element means, light source means, driver means, and a housing. The light receiving element means comprises photoelectric converter means arranged in parallel with each other along a direction of a main scanning direction of the image sensor for receiving a reflection light from an original document to achieve a photoelectric conversion of the light, window means disposed in association with the photoelectric converter means for passing therethrough light to the original document, and electrode means for obtaining a signal from the photoelectric converter means. The optical source means is disposed on a side of a surface of the light receiving element means opposing to a surface on which the photoelectric converter means is fabricated for projecting a light onto the document via the window means. The driver means is disposed to drive the photoelectric converter means and the light source means. The housing retains the light receiving element means, the light source means, and the driver means. The housing is manufactured with an injection molding plastic material to be integral with the light receiving element means.

Moreover, in accordance with the present invention, there is provided a method of manufacturing an image sensor including a first step in which light receiving element means is fixedly mounted on a metallic mold such that a surface of a housing to be thus produced has a predetermined distance or height relative to a surface of the light receiving element means and a second step for injecting a plastic substance into the mold to integrally form the housing.

In accordance with the present invention, the document conveying plane of the housing is identical to the surface of the photoelectric converter means of the light receiving element means or is at a position having a predetermined step relative thereto.

BRIEF DESCRIPTION OF THE DRAWINGS

The objects and features of the present invention will become more apparent from the consideration of the following detailed description taken in conjunction with the accompanying drawings in which:

FIG. 5 is a cross-sectional view showing another embodiment of an image sensor of the complete contact type in accordance with the present invention.

DESCRIPTION OF THE PREFERRED EMBODIMENTS

Figure 1:
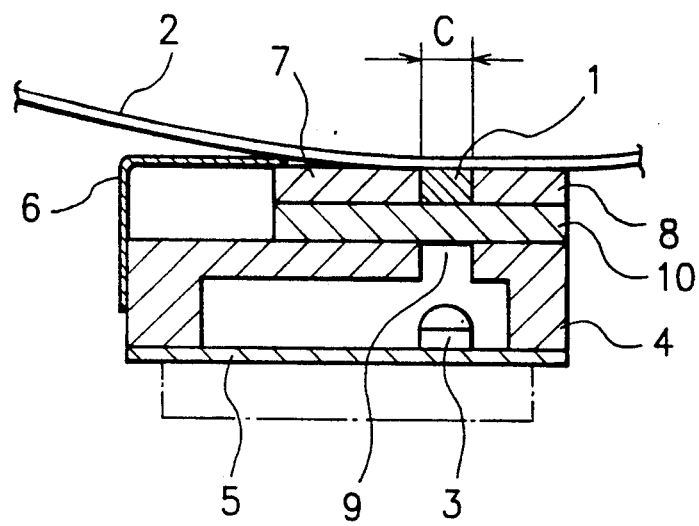
FIG. 1 is a cross-sectional view showing an example of a conventional image sensor of the complete contact type.

Referring now to the drawings, a description will be given of an embodiment of an image sensor in accordance with the present invention.

For easy understanding of the present invention, a conventional image sensor will be first described. FIG. 1 shows an example of a conventional image sensor of the complete contact type. In this image sensor, in a light receiving element substrate 1 including a glass substrate and a portion transparent with respect to light, there are formed such constituent elements as photoelectric converter members fabricated with a conductive material such as CdS, CdSe, or an amorphous silicon, a photoconductive window, and electrodes connected to the photoelectric converter members. For details about the configuration of the light receiving element substrate 1, reference is made, for example, to the Japanese Patent Laid-Open No. 48954/1984.

In operation, an original document 2 is pushed against an upper portion of the photoelectric converter means of the light receiving element substrate 1. A light source 3 illuminates a light onto the document 2 through the photoconductive window formed in the substrate 1 such that a reflection light thereof is received by the photoelectric converting members in the substrate 1, thereby reading an image recorded on the document 2. A housing 4 is manufactured with a metal such as aluminum in a structure for retaining the light receiving element substrate 1, the light source 3, a driver substrate 5, a paper guide 6, etc. The driver substrate 5 includes an output circuit which drives the light source (diode array) 3 and the photoelectric converting members in the substrate 1 to obtain a signal undergone a photoelectric conversion. The output circuit is mounted in a region enclosed with a dot-and-dash line.

The light receiving element substrate 1 is produced as follows. A plurality of patterns are formed in a two-dimensional format on a large substrate having a fixed size. After the patterns are formed, a column of light receiving elements are separated therefrom to attain a one-dimensional light receiving element substrate. To minimize the manufacturing cost of the light receiving element substrate 1, it is desired in many cases to increase the number of substrates to be attained from each substrate having the fixed size. Resultantly, the obtained substrate 1 has a width C ranging from about one millimeter to about six millimeters. When only the light receiving element substrates 1 are arranged in the image sensor, there appears steps in the passage of the document 2 and the steps are hindered when the document 2 is conveyed. To overcome this disadvantage, connection glass regions or plates 7 and 8 are disposed respectively at positions before and after the light receiving element substrate 1. In addition, when arranging these components on an identical plane, it cannot be expected that the housing 4 has a satisfactory flat plane. Moreover, since a slit 9 is formed in the housing 4 to pass therethrough a light from the light source 3, the housing 4 is not strong enough to support the glass regions. Consequently, a support glass region 10 is disposed in a structure such that the substrate 1 and the connection glass regions 7 and 8 are fixed onto the support glass 10.

The conventional image sensor of the complete contact type is produced such that the connection glass regions and the support glass region are fixed onto the light receiving element substrate. In consequence, the numbers of parts and manufacturing steps are increased, which leads to an increase in cost and a reduction in the production yield due to difficulty of the bonding or fixing of the components.

Figure 2:
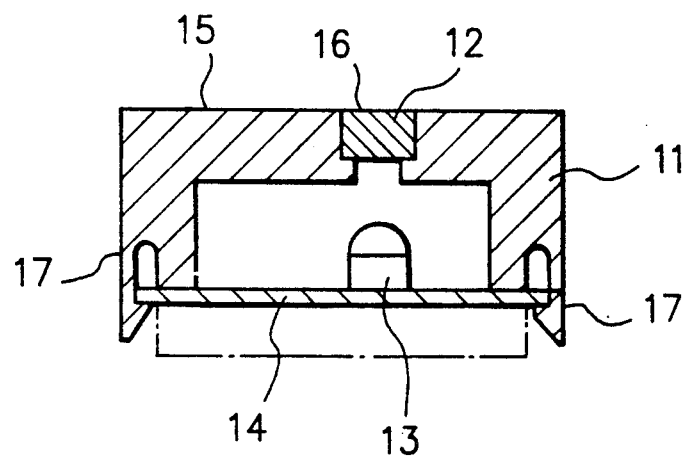
FIG. 2 is a cross-sectional view showing an embodiment of an image sensor of the complete contact type in accordance with the present invention.
Figure 3:
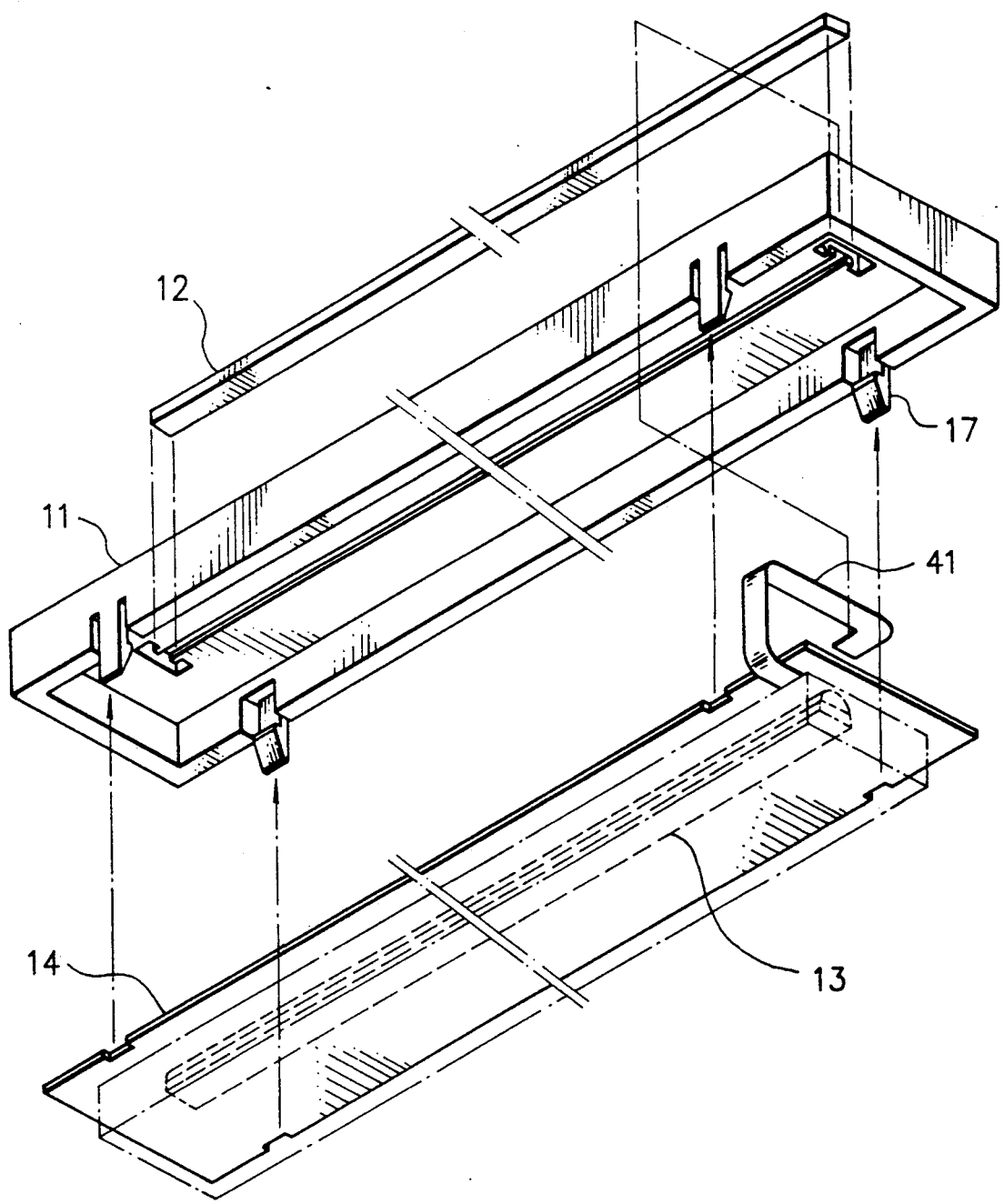
FIG. 3 is an exploded view showing components of the image sensor of FIG. 2.

FIG. 2 is a cross-sectional view showing an embodiment of an image sensor of the complete contact type in accordance with the present invention, whereas FIG. 3 is an exploded view of the sensor of FIG. 2. A housing 11 has a surface to be brought into contact with an original document. Onto the surface is fixedly disposed a light receiving element substrate 12 having an optically transparent portion. In the substrate 12, there are fabricated photoelectric converting members, a photoconductive window, electrodes, etc. (not shown). A light source 13 of an array of light emission diodes is fixed onto a driver substrate 14 for projecting a light from a rear side of the substrate 12 opposing to a side where the photoelectric converting members are formed. The driver substrate 14 includes a circuit which drives the light source 13. The light receiving element substrate 12 is connected via a cable 41 to the driver circuit disposed in the driver substrate 14. The driver substrate 14 is configured to be retained on the housing 11 by an engaging pawl 17.

Figure 4A:
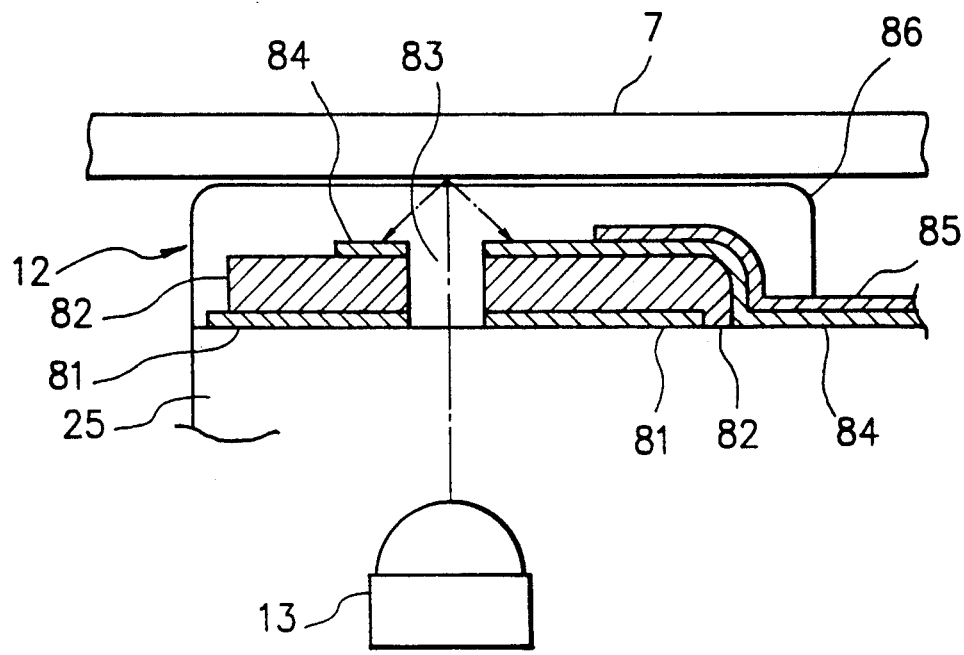
FIGS. 4A and 4B are diagrams respectively showing a plan view and a cross-sectional view of the image sensor of FIG. 2.
Figure 4B:
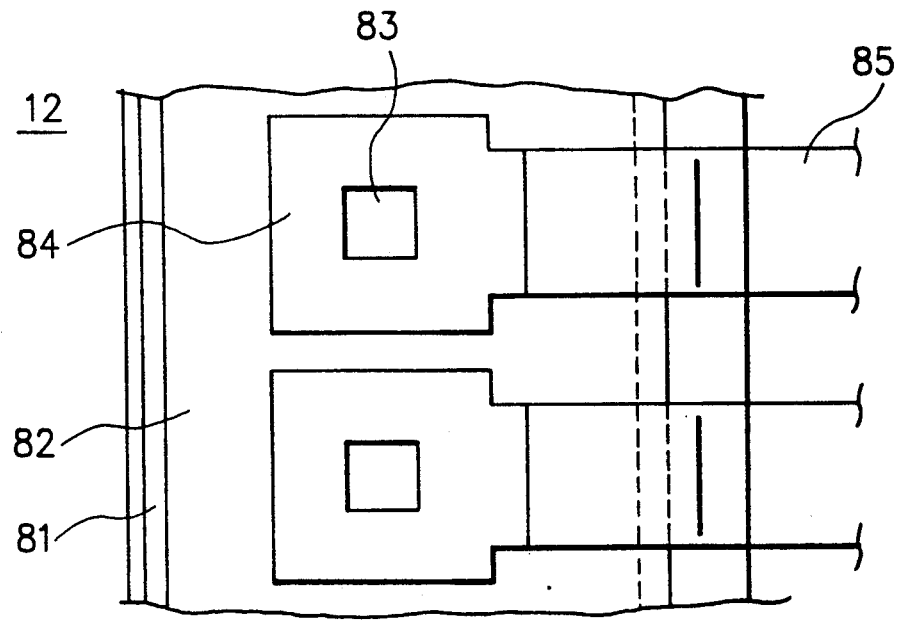

Description will now be given of the structure of the light receiving element substrate 12 by reference to the drawings. FIGS. 4A and 4B are a cross-sectional view and a plan view of the substrate 12, respectively. The cross section is taken along a plane vertical to the main scanning direction of the original document 7.

On a glass substrate 25, there is formed a common electrode layer 81 with a thin film of a metal, which does not pass light therethrough. A layer of photoelectric converting substance 82 is formed thereon, for example, with a hydride of amorphous silicon. Moreover, on the layer 82 is fabricated a transparent electrode layer 84 with indium-tin oxide (InSnO$_3$). In this structure, portions respectively of the common electrode layer 81, the photoelectric converter layer 82, and the transparent electrode layer 84 are adopted as an opening, which functions as a photoconductive window 83. On the transparent electrode layer 84 is manufactured a layer of a metal 85. The transparent electrode layer 84 and the metal layer 85 are employed as separate electrodes. Furthermore, to protect these thin layers, there is disposed a transparent protection layer 86. The original document 7 is brought into contact with the protection layer 86 when conveyed thereon.

The light source 13 is arranged on the rear side of the glass substrate at a position associated with the window 83. A light emitted from the light source 13 is passed through the window 83 to be illuminated onto the document 7. A reflection light from the document 7 enters the photoelectric converter layer 82 disposed in the periphery of the window 83 and is thereby converted into an electric signal. The signal thus produced is obtained from the separate electrodes constituted with the transparent electrode layer 84 and the metal layer 85.

The transparent electrode layer 84 has a region enclosing an exit portion of the window 83 so as to efficiently receive the reflection light from the document 7. The metal layer 85 and the common electrode layer 81 which are in contact with the transparent electrode 84 are connected to each other via a cable 41 shown in FIG. 3.

The windows 83 are arranged in a string for each of the respective light receiving elements along the main scanning direction of the document 7, namely, with a pitch of eight windows per millimeter.

The housing 11 is formed with an injection molding plastic substance. In the injection molding process of the housing 11, the light receiving element substrate 12 is beforehand mounted at a predetermined position of a metal mold prepared for the production of the housing 11. In this situation, the mold is arranged such that a surface thereof to be in contact with the surface 16 of the substrate 12 where the photoelectric converting means is formed is in a plane including a surface of the housing 11 which is to be brought into contact with a document conveying surface 15. Thereafter, the plastic substance melted by heat is injected into the mold to produce the housing 11. Namely, the surface of the substrate 12 where the photoelectric converting means is formed is arranged in the plane including the document conveying surface 15 of the housing 11, thereby providing a plane which does not hinder the passage of the document 7. In this regard, to prevent heat dissipated from the plastic from exerting an adverse influence onto the light receiving element substrate 12, the injection molding process is achieved while cooling the substrate 12 with water.

Thanks to the injection molding, the housing 11 can be formed in an arbitrary contour. In consequence, as shown in FIG. 2, the engaging pawls 17 are integrally disposed in the housing 11 to engage the driver substrate 14 with the housing 11. Resultantly, the light source 13 and the driver substrate 14 can be fixedly attached onto the housing 11 without using screws. Moreover, the housing 11 may be provided with other necessary functional members, for example, a projection for alignment necessary for a document read operation.

FIG. 5 shows an alternative embodiment of an image sensor in accordance with the present invention. Also in this image sensor, a housing 11 and a light receiving element substrate 12 are fabricated in the same molding method as described above. In this embodiment, the document is transported in a direction denoted by an arrow A. A document conveying surface 15 of the housing 11 is established by a left-side document conveying surface 15A of the substrate 12 on a side where the document is fed to the sensor and a right-side document conveying surface 15B thereof on a side where the document is ejected therefrom. The surface 15A is higher than an upper surface of the substrate 12 by a distance H in the configuration of this diagram, whereas the surface 15B is lower than the upper surface by a distance H. Before fabricating the surfaces 15A and 15B, the associated surfaces of the mold are required to be formed in the objective shapes as above. When the plastic is injected into the prepared mold to form the housing 11, there are attained the desired conveying surfaces having the steps as above.

When the document 7 is transported for the scanning operation, the document conveying surfaces 15A and 15B of the image sensor become to be lower along the passage of the document 7. Consequently, there does not appear any hindrance and hence the document 7 can be smoothly transported.

The step H between the document conveying surface 15A of the housing 11 and the substrate 12 and the step H between the substrate 12 and the document conveying surface 15B are advantageously set be 0.5 mm or less. In accordance with this embodiment, since the housing 11 and the transparent substrate 12 are simultaneously produced to be integral with each other, the error in the production of the step H can be remarkably reduced. In this connection, the steps H on the respective sides of the light receiving element substrate 12 need not be identical to each other.

As above, in the image sensor in accordance with the present invention, the housing which retains the light receiving element substrate, the light source, and the driver substrate is fabricated with an injection molding plastic substance; moreover, the housing and the light receiving element substrate are simultaneously formed in an integral manner. As a result, such components required in the prior art as the connection glass regions, the support glass region, and the paper guide can be dispensed with. Consequently, the number of parts of this image sensor can be minimized as compared with the image sensor of the prior art.

In addition, since the image sensor is manufactured from an injection molding plastic material through a monoblock molding process, there are attained advantages that the number of process steps can be considerably decreased and the production cost of the image sensor is remarkably reduced. Moreover, in accordance with the present invention, the bonding step, which has been a troublesome process in the prior art, is unnecessitated and hence the production yield can be improved. Furthermore, the housing is fabricated to be integral with the light receiving element substrate, thereby leading to advantages that the document conveying surface can be produced with a higher fabrication precision and the document can be smoothly transported. As above, in accordance with the present invention, a highly reliable image sensor of the complete contact type can be produced at a low cost.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An image sensor comprising:

light receiving element means comprising photoelectric converter means arranged in parallel with each other along a main scanning direction of said image sensor for receiving light reflected from an original document and for photoelectrically converting the light, window means disposed in association with said photoelectric converter means for allowing light to pass therethrough to the original document, and electrode means for obtaining a signal from the photoelectric converter means;

light source means disposed on a side of a surface of said light receiving element means opposing to a surface on which said photoelectric converter means is fabricated for projecting a light onto the document via said window means;

driver means for driving said photoelectric converter means and said light source means; and a housing for retaining said light receiving element means, said light source means, and said driver means, said housing being integral with said light receiving element means and including engaging means for retaining said driver means.

2. An image sensor as claimed in claim 1, wherein said housing is manufactured such that a surface thereof disposed on a side of said light receiving element means where said photoelectric converter means is formed is in a plane that includes a surface of said photoelectric converter means.

3. An image sensor as claimed in claim 1, wherein said housing is manufactured such that a surface thereof disposed on a side of said light receiving element means where said photoelectric converter means is formed is manufactured relative to the surface of said photoelectric converter means, the surface of said housing being gradually lowered along a direction of passage of the document.

4. An image sensor as claimed in claim 1, wherein said window means is disposed such that a periphery thereof is enclosed by said photoelectric converter means.

5. An image sensor as claimed in claim 1, wherein said electrode means includes a common electrode disposed on a side of said photoelectric converter means and a separate electrode arranged on another side thereof.

* * * * *